United States Patent [19]
Lentz et al.

[11] Patent Number: 5,101,298
[45] Date of Patent: Mar. 31, 1992

[54] TELEVISION LENS SHADE

[76] Inventors: Blaine Lentz, 21900 Marylee St. #262, Woodland Hills, Calif. 91367; C. Martin Smith, 10978 Ayres Ave., Los Angeles, Calif. 90064

[21] Appl. No.: 662,844

[22] Filed: Mar. 1, 1991

[51] Int. Cl.⁵ .................. G02B 27/00; H04N 5/64
[52] U.S. Cl. .................. 359/612; 358/252; 358/255
[58] Field of Search .......... 350/581, 580, 276 R, 350/276 L; 358/252, 255

[56] References Cited

U.S. PATENT DOCUMENTS

| | | | |
|---|---|---|---|
| 3,269,289 | 8/1966 | Ginter | 95/11 |
| 3,329,770 | 7/1967 | Rose | 358/255 |
| 3,564,138 | 2/1971 | Harrold | 358/255 |
| 3,849,598 | 11/1974 | Hoffberger et al. | 358/255 |
| 4,205,895 | 6/1980 | Yurdin et al. | 350/60 |
| 4,314,280 | 2/1982 | Rose | 350/581 |
| 4,468,102 | 8/1984 | Chikano | 350/581 |
| 4,497,549 | 2/1985 | Yurdin et al. | 350/581 |
| 4,633,324 | 12/1986 | Giulie | 358/252 |
| 4,784,468 | 11/1988 | Tierney | 358/252 |
| 4,788,597 | 11/1988 | Gart et al. | 358/252 |
| 4,834,330 | 5/1989 | Swillinger | 358/252 |
| 4,863,242 | 9/1989 | Correa | 350/276 R |

FOREIGN PATENT DOCUMENTS 677165 8/1952 United Kingdom ............... 350/581

Primary Examiner—Jon W. Henry
Attorney, Agent, or Firm—Gene Scott

[57] ABSTRACT

A flexible mounting band with means for attachment to a camera and shade pieces, the shade pieces being made of opaque, flexible, plastic sheet material. A top shade piece attaches to the mounting band and extends outward from above the camera lens, adjustable over a range of angles. Two side shade pieces are attached to the top shade piece and are adjustable in angle to the top piece and in lateral distance therefrom for fitting a variety of camera lens widths. A hinge means is formed in the top shade piece and side shade pieces for angle adjustment, whereby each piece can be adjusted independently to obtain a desired lighting effect. A visor extends forward from the top shade piece and rear screening sections extend rearward from the side shade pieces to further control the light entering the camera lens. When dismantled, the shade apparatus is configured into an easily portable bundle of shade pieces securely wrapped with the mounting band.

10 Claims, 5 Drawing Sheets

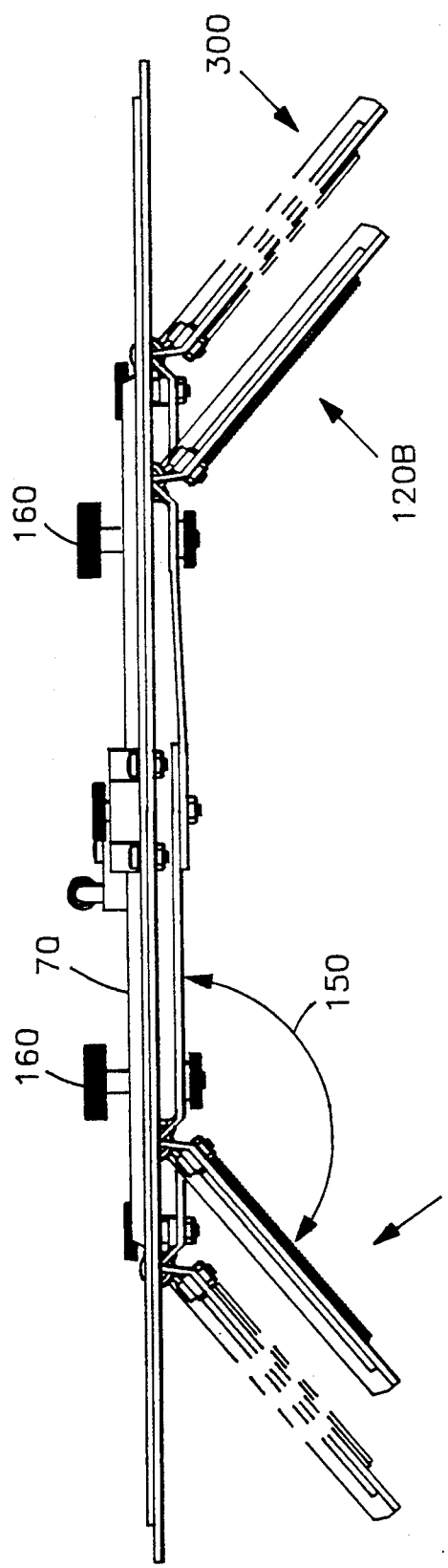
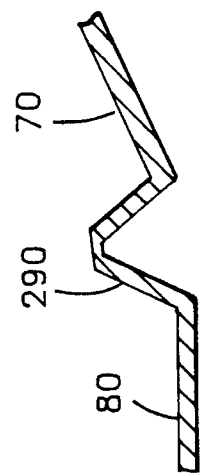
FIG. 5
FIG. 4

TELEVISION LENS SHADE

FIELD OF THE INVENTION

This invention relates in general to camera devices. More particularly, this invention relates to camera lens shading apparati.

BACKGROUND OF THE INVENTION

In the film and video industry the term "lens flare" refer to light refraction within a camera lens. Lens flare is created when strong direct light, such as sunlight, enters the camera at a peripheral angle. As lens flare is visible in the resulting camera image, it is usually an undesirable effect. As a result, several shade devices have been invented to block such peripheral light in order to reduce or eliminate lens flare.

One common shade device is an opaque collapsible bellows that mounts with rigid mounting hardware at one end to a camera or camera lens, and at the other end to a plate designed to receive various visual effects equipment, such as light filters. The number of components in this shading device make it relatively expensive to manufacture. Further, the bellows is only adjustable towards and away from the camera lens, making it limited in its versatility. If an extremely wide-angle shot is required, this device must be removed from the camera altogether since it cannot be retracted behind the field of view. Moreover, this device is adaptable to different diameter lenses only through use of replaceable adaptors, further complicating the transportation and use of the device. These replaceable adaptors are not designed for use with rectangular or square lens shapes. In addition, the bellows on this device is somewhat fragile, and in situations requiring a shading device of extreme strength or resilience, such as the filming of sporting events or exposure to extreme wind and weather conditions, this device is unsuitable.

Another lens shade device is made of flexible material and has the approximate shape of a hollow cylinder. This device is made entirely of pliable material into which are formed annular hinge sections. One drawback of this device is that it is adjustable only towards and away from the camera lens, making it limited in its versatility. Further, this device is not adaptable to different diameter lenses, and consequently a variety of sizes of this device must be available if the device is to be used on a variety of lens diameters. In addition, this device is not designed for use with rectangular or square lens shapes, and also prevents the lens cap of the camera or external filter elements from being used properly.

While other shading devices are available, none have beeen found that do not have some of the drawbacks mentioned above. In expensive video or film productions it is important to minimize costs whenever possible, and current camera shading devices are typically expensive and inconvenient to adjust, to mount to the camera, and use. Clearly, then, there is a need for a camera shade apparatus that is relatively inexpensive, that is adaptable to a wide variety of lens sizes and shapes, that allows independent control of shading elements, that is strong enough to withstand extreme wind and weather conditions, that is relatively durable, that will allow the proper fitting of a lens cap or external filter elements onto the lens, that will allow for a wide variety of shooting angles, and that, when dismantled, is easily portable. The present invention fulfills these needs and provides further related advantages.

SUMMARY OF THE INVENTION

The present invention is a shade apparatus firmly held by a flexible mounting band that attaches around any camera, monitor, lens, or teleprompter. The shade attaches to the mounting band. The top shade piece is adjustable over a range of angles with respect to the mounting band through a hinge means, and this angle can be fixed with a means for position locking. Two side shade pieces attach through a hinge means to the left and right side of the top shade section. Both side shade pieces, mirror images of each other, are adjustable in angle with respect to the top shade section, and they can also be in angle with a means for position locking. A visor piece, also hingably attached to the top shade section, is included contiguous to the top shade section to provide further light screening versatility. In operation, the top shade section is mounted at the top and just rearward of the camera lens. Each side shade piece is then adjusted so as to block light entering the camera lens from the sides, and the top shade section and visor are adjusted so as to block light entering the camera lens from above, as desired. The shade position locking means are used to fix the relative angular position of each shade piece. The visor piece is adjusted in a similar fashion.

Of importance is the means used for articulated movement between the various sections of the shade. The sections are attached to each other by continuous hinges formed of their sections of the sheet plastic. These hinges provide no gaps or openings for light to enter and are very bent for accommodation of a wide range of motion. Because the axis of hinge motion is out of the plane of the sections joined by the hinge, the actual hinge line is formed at the juncture of two angular arms forming a V-shape. The hinges are a "living hinge" formed as integral parts of the molded shade.

As the mounting band is made from a flexible naterial and can be of any length, it conforms to all shapes and sizes of current camera lenses. In addition, as the top shade section is mounted just rearward of the lens, any wide angle shot, may be taken with the camera. Further, the lens cap and other external filter or effects elements may be securely positioned on the lens without interference from the shade device. This is especially beneficial for television video cameras, as keeping the lens on such cameras covered helps tp protect the expensive video tube from impact. Each shading piece is independent from the others so that the camera operator has complete flexibility in establishing a desired shade configuration. The shading pieces are made of a tough, durable, opaque material to withstand unexpected impact and extreme weather conditions. When the apparatus is disassembled it lies flat, conveniently wrapped with the mounting band for ease of storage.

The advantages of the invention include, first, that the shade may be quickly mounted with its mounting band onto most cameras. Therefore a single shade can be quickly transferred and, consequently, used with a variety of cameras, monitors, and the like. Second, no modification to the camera is required. Also, adjustable side leaves allow the invention to fit most applications. Finally, the position locking features permit recurring use of the shade without re-adjustment.

Other features and advantages of the present invention will become apparent from the following more detailed description, taken in conjunction with the accompanying drawings, which illustrate, by way of example, the principles of the invention.

BACKGROUND OF THE DRAWINGS

The accompanying drawings illustrate the invention. In such drawings:

FIG. 4 is a cross-sectional view of the top shade piece of the invention of FIG. 1, illustrating a thin section hinge; and FIG. 5 is a cross-sectional view of the top piece of the invention, taken generally along lines 5—5 of FIG. 2.

DETAILED DESCRIPTION OF THE PREFERRED EMBODIMENT

Figure 1:
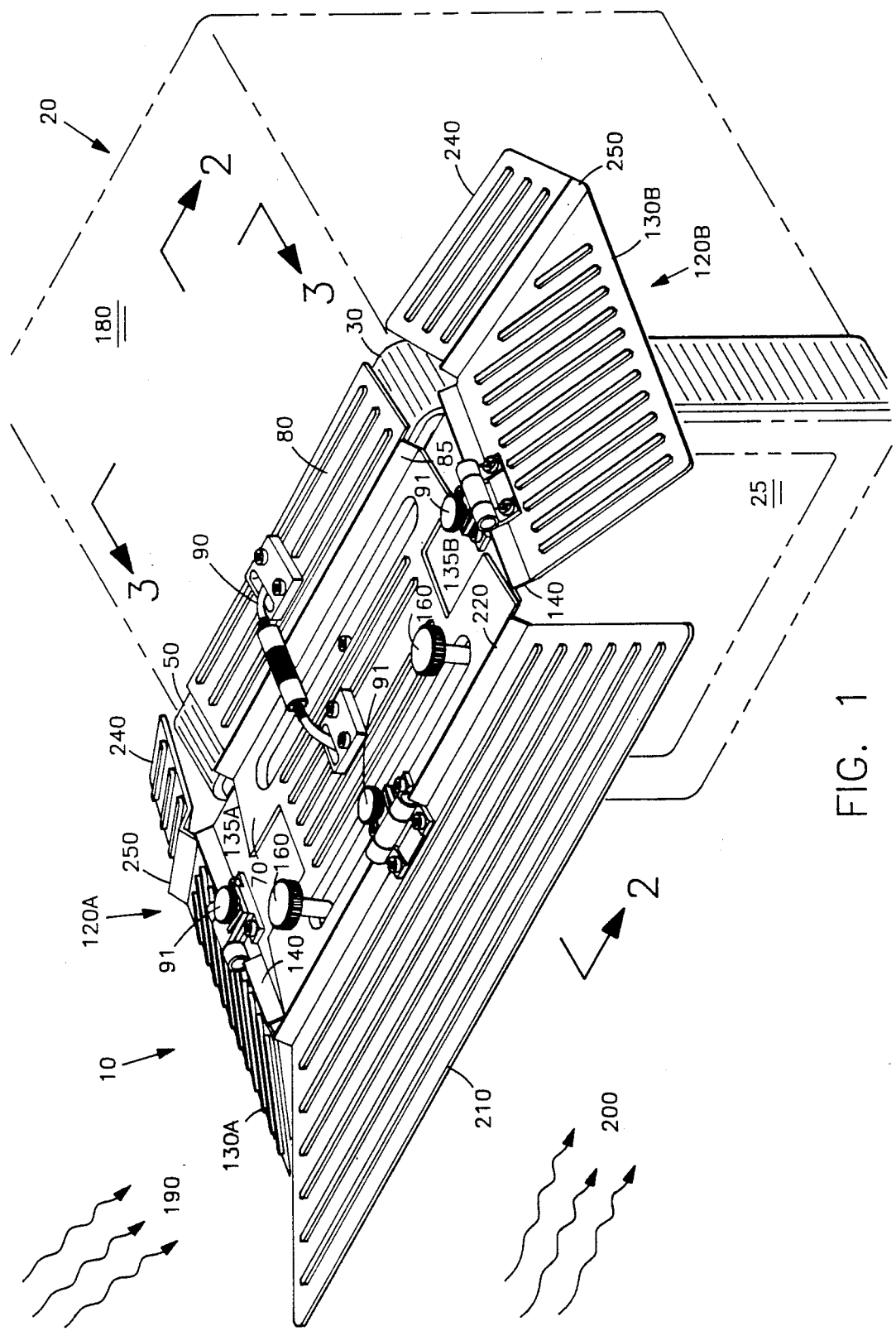
FIG. 1 is a perspective illustration of the invention illustrating a camera shade apparatus with a visor piece.
Figure 2:
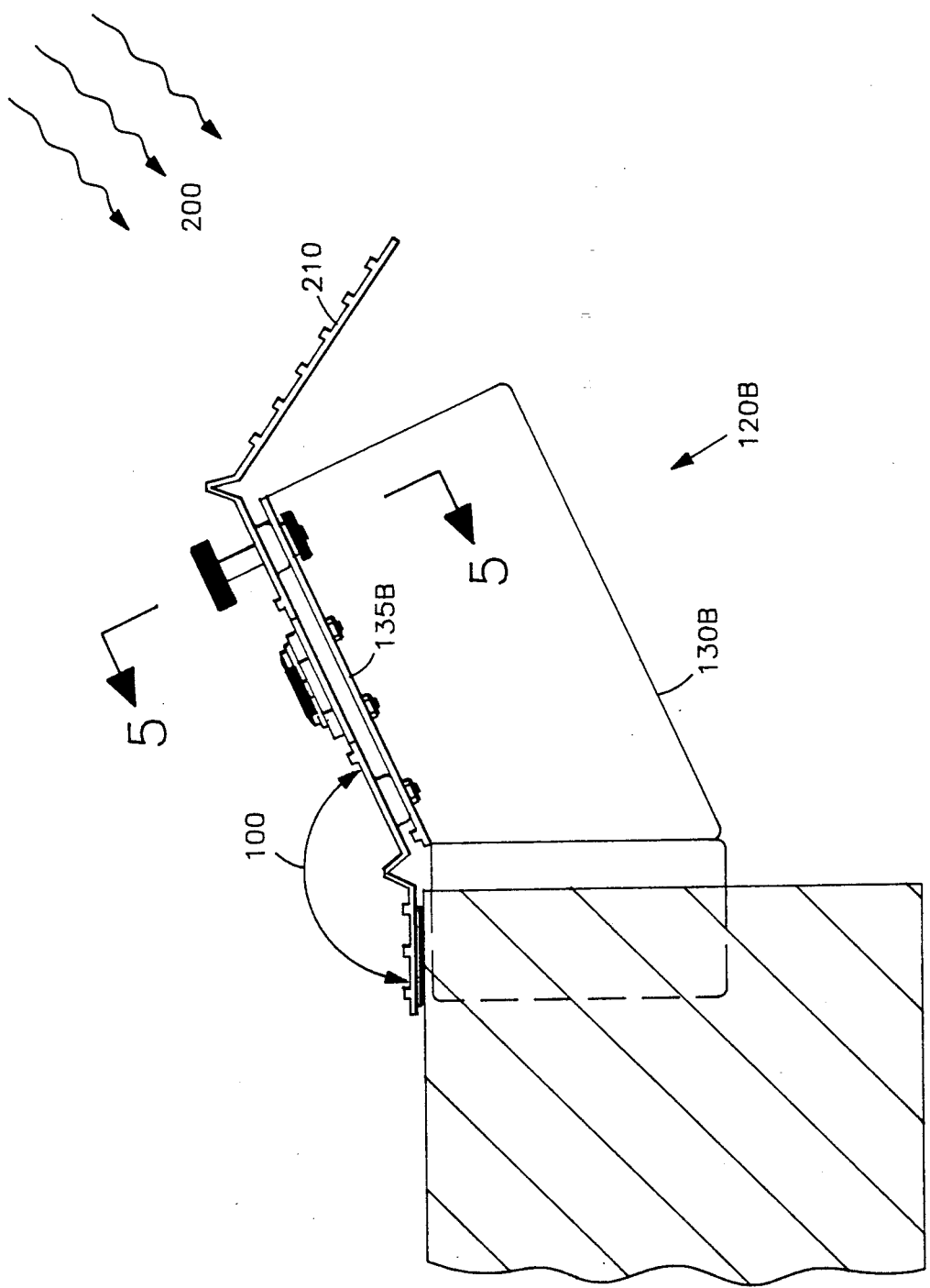
FIG. 2 is a cross-sectional right side elevational view of the invention taken generally along lines 2—2 of FIG. 1.

FIGS. 1 illustrates a shade apparatus 10 for screening a camera 20, the camera 20 having top 180 and lens 25. A mounting band 30 has a camera attachment means 40, shown in FIG. 3, and a shade attachment means 50 for attaching the shade apparatus 10 to the camera 20. Preferably, camera attachment means 40 and shade attachment means 50 are of a hook and loop type fastener. The shade apparatus 10 includes a top screening section 70 contiguous to a top mounting section 80 and a visor section 210. A first hingable mutual adjustment means 85 joins the top screening section 70 to the top mounting section 80, and a position locking means 90 is included for temporarily setting an angle 100 therebetween. Preferably, the first hingable mutual adjustment means 85 is a thin section 290 of the sheet material used (FIG. 4), and each position locking means 90 is a turnbuckle assembly. The top mounting section 80 includes a mounting means 110 for cooperatively mounting the shade apparatus 10 to the attachment means 50 of the mounting band 30.

A pair of side shade pieces 120A, 120B are each, in shape, a mirror image of the other, and each includes a side screening section 130A, 130B contiguous to a side mounting section 135A, 135B. Preferably, each side screening section 130A, 130B and the top screening section 70 are planar semi-rigid sheets of flexible plastic sheet material. A second hingable mutual adjustment means 140, preferably one thin section 290, joins each side screening section 130A, 130B to the side mounting section 135A, 135B, respectively. A second position locking means 91 is included for temporarily setting an angle 150 between each side screening section 130A, 130B and each side mounting section 135A, 135B, respectively. Each side mounting section 135A, 135B includes a mounting means 160 for mounting each side shade piece 120A, 120B to the top screening section 70.

Figure 3:
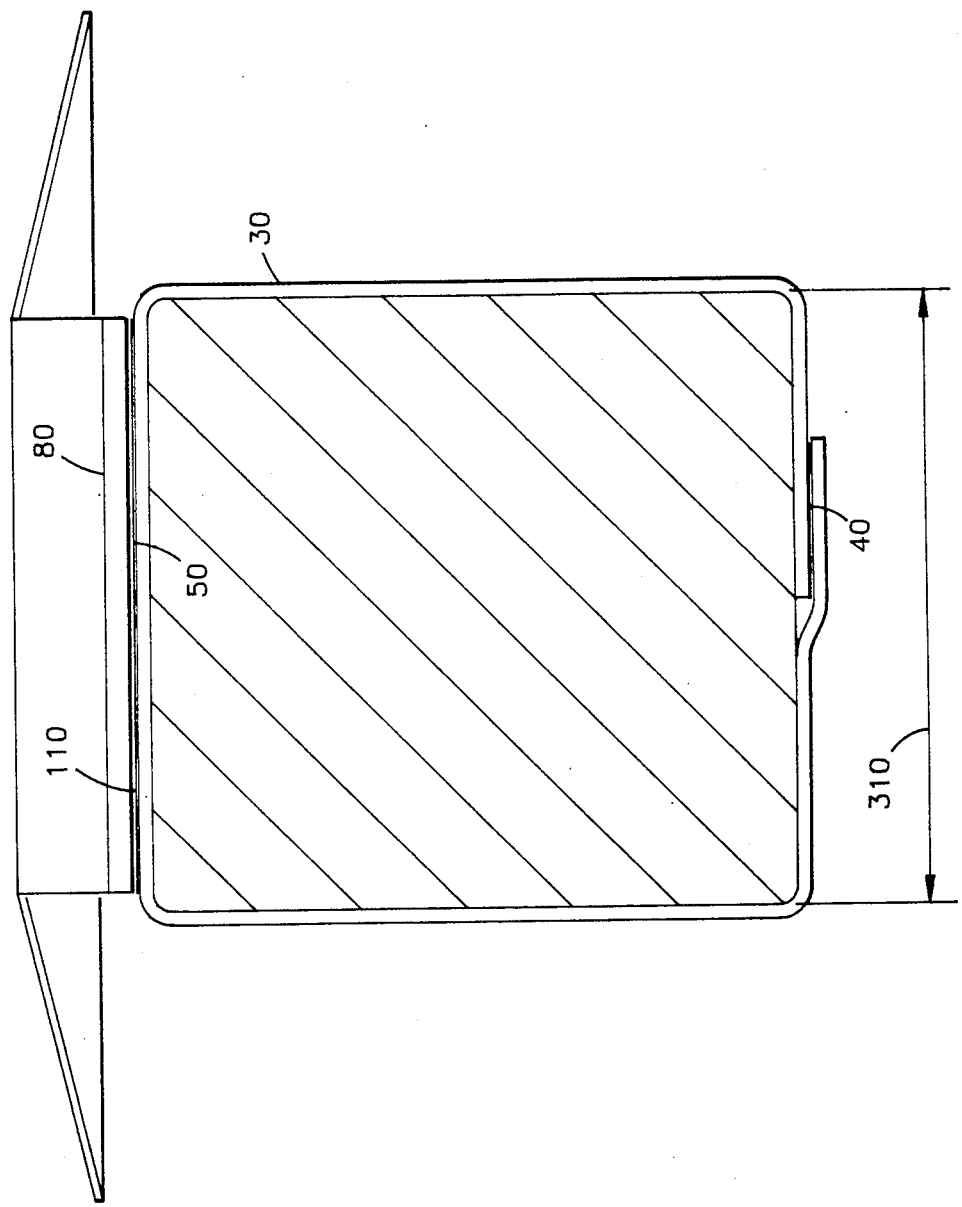
FIG. 3 is a cross-sectional rear elevational view of the invention taken generally along lines 3—3 of FIG. 1, shown without the side shade pieces.
Figure 6:
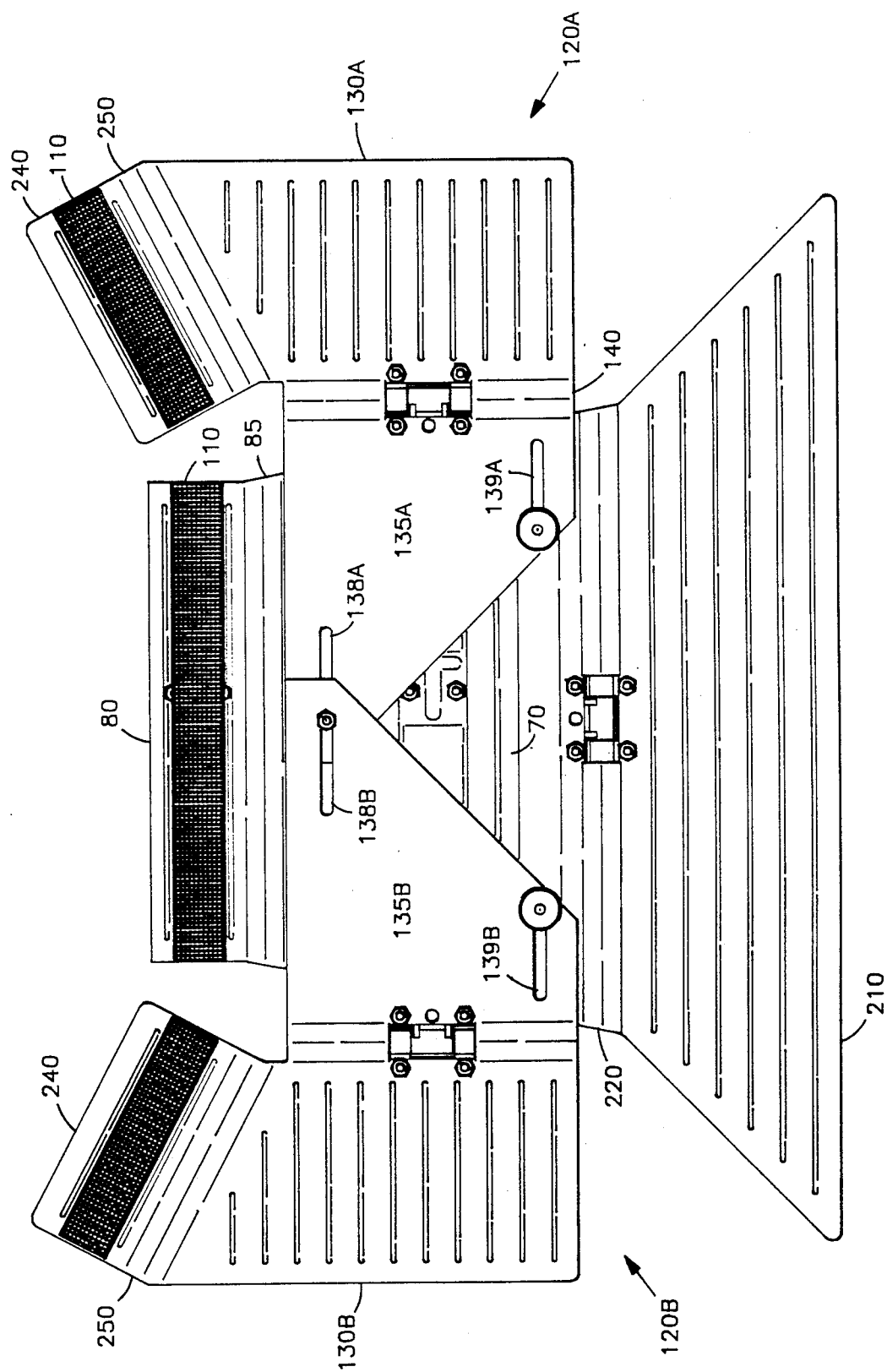
FIG. 6 is a bottom plan view of the invention.

In the preferred embodiment of the invention, the mounting means 160 for mounting the side shade pieces 120A, 120B to the top screening section 70 is an adjustable thumbscrew (FIG. 5), accommodating a range of positions 300 of the side shade pieces 120A, 120B so that the shade apparatus 10 will fit tightly on a range of camera widths 310, illustrated in FIG. 3.

A visor section 210 is contiguous to the top screening section 70 and is joined thereto by a third hingable mutual adjustment means 220, preferably one thin section 290 (FIG. 4). Position locking means 91 is included for temporarily setting an angle between the top screening section 70 and the visor section 210. The visor section 210, preferably, is an isosceles trapezoid with the small base edge interconnected with the top screening section 70, and is formed from flexible plastic sheet material.

Each side screening section 130A, 130B includes a rear screening 240 contiguous thereto, formed preferably of a planar semi-rigid sheet of flexible plastic sheet material. A fourth hingable mutual adjustment means 250, preferably one thin section 290, joins each rear screening section 240 to one side screening section 130A, 130B. A position locking means (not shown), similar to that of position locking means 90, may be used to temporarily set an angle between each rear screening section and the side screening section 130A, 130B. Rear screening sections 240 have attached on one side a strip of the mounting means 110. This enables closure of rear screening sections 240 against mounting band 30 in order to prevent light from the rear of the camera 20 from passing to the front of the lens 25.

In operation, the top shade piece is mounted to the top 180 of the camera 20 with the mounting band 30. The side shade pieces 120A, 120B are mounted in opposition on opposite sides of the top screening section 70 with the side mounting sections, 135A, 135B abutting the top screening section 70 and the top 180 of the camera 20 so that the side screening sections 130A, 130B and each rear screening section 240 are positioned to block light 190 arriving at the lens 25 of the camera 20 from the side or rear, but not to block the proper fitting of a lens cap or filter element (not shown) on the lens 25. The top screening section 70 and the visor 210 are positioned to block light 200 arriving at the lens 25 of the camera 20 from above, but not to block the proper fitting of a lens cap or filter element on the lens 25. Side shade pieces 120A and 120B may be adjusted by sliding laterally for accommodation of various widths of camera 20. The lateral motion is facilitated by slats 138A, 138B and 139A, 139B.

When dismantled, the top screening section 70, the visor section 210, and each side shade piece 120A, 120B may be positioned to lie flat, generally parallel and in contact with each other. When wrapped with the mounting band 30, a conveniently carried bundle is formed.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A shade apparatus for screening a television camera from direct or reflected light, comprising:

a mounting band, for encircling the camera, around the sides, top and bottom surfaces of the camera, having a means for attachment to the camera, the mounting band having further means for attachment to said shade apparatus;

a top shade piece including a planar, approximately rectangular top screening section contiguous to a planar, approximately rectangular top mounting section, the screening section joined along one edge to the mounting section by a first means for hingable mutual adjustment thereof and further including a means for position locking for temporarily setting an angle between said top screening section and said top mounting section, the top mounting section having means for mounting said top shade piece onto said further means for attachment of said mounting band; and a pair of side shade pieces, each side shade piece being, in shape, a mirror image of the other, each including a side screening section contiguous to a side mounting section and joined thereto by a second means for hingable mutual adjustment thereof and further including said means for position locking for temporarily setting an angle between said side screening section and said side mounting section, said side shade pieces having means for mounting to said top screening section, such that said side mounting sections are adjacent said top screening section;

whereby said side shade pieces are mounted in opposition on opposite sides of said top screening section with said side mounting sections abutting said top screening section and the top of said camera so that said side screening sections are positioned to block light arriving at the camera's lense from the side while said top screening section is positioned to block light arriving at the camera's lens from above.

2. The shade apparatus of claim 1 wherein said top shade piece further includes a visor section contiguous to said top screening section and joined thereto by a third means for hingable mutual adjustment thereof and further including said means for position locking for temporarily setting an angle between said top screening section and said visor section.

3. The shade apparatus of claim 2 wherein the visor section is narrowest at said means for hingable adjustment and widest at the opposite edge.

4. The shade apparatus of claim 1 wherein each said side shade piece further includes a rear screening section contiguous to said side screening section and is joined thereto by a fourth means for hingable mutual adjustment thereof.

5. The shade apparatus of claim 4 wherein said rear screening section is a planar semi-rigid sheet.

6. The shade apparatus of claim 1 wherein said top screening section and said side screening sections are planar semi-rigid sheets.

7. The shade apparatus of claim 1 wherein said means for position locking is a turnbuckle assembly for fine adjustment of said angles.

8. The shade apparatus of claim 1 wherein said top shade piece and side shade pieces are made of flexible plastic sheet material.

9. The shade apparatus of claim 8 wherein said means for hingable mutual adjustment is a thin section of said plastic sheet material.

10. The shade apparatus of claim 1 wherein said means for mounting to said top screening section is adjustable, accommodating a range of positions of said side shade pieces so that said shade apparatus will fit tightly on a range of television camera widths.

* * * * *